United States Patent
Yamada

(10) Patent No.: US 11,436,273 B2
(45) Date of Patent: Sep. 6, 2022

(54) IMAGE SEARCH APPARATUS, IMAGE SEARCH METHOD, NON-TRANSITORY RECORDING MEDIUM

(71) Applicant: GURUNAVI, Inc., Tokyo (JP)

(72) Inventor: Atsushi Yamada, Tokyo (JP)

(73) Assignee: GURUNAVI, INC., Tokyo (JP)

( * ) Notice: Subject to any disclaimer, the term of this patent is extended or adjusted under 35 U.S.C. 154(b) by 387 days.

(21) Appl. No.: 16/682,926

(22) Filed: Nov. 13, 2019

(65) Prior Publication Data
US 2020/0151209 A1    May 14, 2020

(30) Foreign Application Priority Data

Nov. 14, 2018  (JP) ............................. JP2018-213399
Sep. 4, 2019   (JP) ............................. JP2019-161236

(51) Int. Cl.
| | | |
|---|---|---|
| G06F 16/535 | (2019.01) | |
| G06F 16/58 | (2019.01) | |
| G06F 16/532 | (2019.01) | |
| G06F 16/51 | (2019.01) | |
| G06F 16/583 | (2019.01) | |

(52) U.S. Cl.
CPC ............ G06F 16/535 (2019.01); G06F 16/51 (2019.01); G06F 16/532 (2019.01); G06F 16/583 (2019.01); G06F 16/5866 (2019.01)

(58) Field of Classification Search
None
See application file for complete search history.

(56) References Cited

U.S. PATENT DOCUMENTS

| | | | | |
|---|---|---|---|---|
| 8,180,396 | B2 * | 5/2012 | Athsani | G06F 16/434 |
| | | | | 455/418 |
| 2009/0102859 | A1 * | 4/2009 | Athsani | G06F 3/011 |
| | | | | 345/619 |
| 2012/0127201 | A1 * | 5/2012 | Kim | G09G 5/377 |
| | | | | 345/633 |
| 2015/0088712 | A1 * | 3/2015 | Votaw | G06Q 50/01 |
| | | | | 705/35 |

(Continued)

OTHER PUBLICATIONS

"Instagram" Facebook, Inc. Available online at https://www.instagram.com/, Published on Oct. 6, 2010, 1 page.

*Primary Examiner* — Bernard Krasnic
(74) *Attorney, Agent, or Firm* — Alleman Hall Creasman & Tuttle LLP

(57) ABSTRACT

An image search apparatus includes a search processing unit, a first display processing unit, and a second display processing unit. The search processing unit extracts one or more images that meet a search condition, from a plurality of images associated with user accounts. The first display processing unit displays, as a result of search, the one or more images extracted by the search processing unit. The second display processing unit displays a predetermined specific page when, among the one or more images displayed as the result of search, a personally photographed image is operated, the personally photographed image being an image associated with a first-type user account and photographed at a facility corresponding to a second-type user account that is different from the first-type user account, the specific page corresponding to the second-type user account.

17 Claims, 9 Drawing Sheets

(56) References Cited

U.S. PATENT DOCUMENTS

| | | | | |
|---|---|---|---|---|
| 2015/0215385 | A1* | 7/2015 | Raichelgauz | G06F 16/435 709/203 |
| 2018/0349417 | A1* | 12/2018 | Lu | G06F 16/583 |
| 2019/0354638 | A1* | 11/2019 | Kievit-Kylar | G06F 16/951 |
| 2021/0055837 | A1* | 2/2021 | Rose | G06F 3/011 |

* cited by examiner

FIG.2

USER ACCOUNT INFORMATION

| USER ID | PASSWORD | ACCOUNT TYPE |
|---|---|---|
| USER A | aaaaa | PERSONAL ACCOUNT |
| USER B | bbbbb | BUSINESS ACCOUNT |
| USER C | ccccc | BUSINESS ACCOUNT |
| USER D | ddddd | PERSONAL ACCOUNT |
| USER E | eeeee | PERSONAL ACCOUNT |
| ⋮ | ⋮ | ⋮ |

FIG.3

IMAGE INFORMATION

| IMAGE ID | USER ID | TAG INFO | POSITION INFO |
|---|---|---|---|
| IMAGE A | USER C | CHEESE PLATE | RESTAURANT C |
| IMAGE B | USER C | CARBONARA | RESTAURANT C |
| IMAGE C | USER D | SHOES | — |
| IMAGE D | USER E | CARBONARA | RESTAURANT C |
| IMAGE E | USER B | — | HOTEL B |
| ⋮ | ⋮ | ⋮ | ⋮ |

FIG.4

BUSINESS PROFILE INFORMATION

| USER ID | FACILITY NAME | TELEPHONE NO. | EMAIL ADDRESS | ADDRESS | RESERVATION WEB PAGE |
|---|---|---|---|---|---|
| USER B | HOTEL B | 03-1234-5678 | bbb@mail.com | ..., TOKYO | http://hotel.com/bbb |
| USER C | RESTAURANT C | 04-2345-6789 | ccc@mail.com | ..., TOKYO | http://gnavi.com/ccc |
| USER F | RESTAURANT F | 05-3456-7890 | fff@mail.com | ..., AICHI | http://gnavi.com/fff |
| USER G | SHOP G | 06-4567-8901 | ggg@mail.com | ..., OSAKA | http://shop.com/ggg |
| USER H | RESTAURANT H | 07-5678-9012 | hhh@mail.com | ..., OSAKA | http://gnavi.com/hhh |
| ... | ... | ... | ... | ... | ... |

IMAGE SEARCH APPARATUS, IMAGE SEARCH METHOD, NON-TRANSITORY RECORDING MEDIUM

INCORPORATION BY REFERENCE

This application is based upon and claims the benefit of priority from the corresponding Japanese Patent Application No. 2018-213399 filed on Nov. 14, 2018, and No. 2019-161236 filed on Sep. 4, 2019, the entire contents of which are incorporated herein by reference.

BACKGROUND OF THE INVENTION

Field of the Invention

The present disclosure relates to an image search apparatus, an image search method, and a non-transitory recording medium.

Description of Related Art

There is known an image sharing service through which users can disclose images that the users themselves photographed to public users by uploading (posting) the images to a specific server on the Internet. The image sharing service provides an image search function for searching for a desired image among a plurality of images uploaded to the server. For example, when a user performs a search using "carbonara" as a keyword, a list of images to which a tag "carbonara" is attached, is displayed as a search result. In addition, the image sharing service allows the user to, for example, make a phone call, send an email, and/or make a reservation to the restaurant from a profile page of a business account such as a restaurant.

SUMMARY OF THE INVENTION

An image search apparatus relating to a first aspect of the present disclosure includes a search processing unit, a first display processing unit, and a second display processing unit. The search processing unit extracts one or more images that meet a search condition, from a plurality of images associated with user accounts. The first display processing unit displays, as a result of search, the one or more images extracted by the search processing unit. The second display processing unit displays a predetermined specific page when, among the one or more images displayed as the result of search, a personally photographed image is operated, the personally photographed image being an image associated with a first-type user account and photographed at a facility corresponding to a second-type user account that is different from the first-type user account, the specific page corresponding to the second-type user account.

An image search method relating to another aspect of the present disclosure causes one or more processors to execute a search step, a first display step, and a second display step. In the search step, one or more images that meet a search condition are extracted from a plurality of images associated with user accounts. In the first display step, the one or more images extracted in the search step are displayed as a result of search. In the second display step, a predetermined specific page is displayed when, among the one or more images displayed as the result of search, a personally photographed image is operated, the personally photographed image being an image associated with a first-type user account and photographed at a facility corresponding to a second-type user account that is different from the first-type user account, the specific page corresponding to the second-type user account.

A non-transitory computer-readable recording medium relating to a further aspect of the present disclosure is a recording medium in which is recorded an image search program that causes one or more processors to execute: a search step of extracting one or more images that meet a search condition, from a plurality of images associated with user accounts; a first display step of displaying, as a result of search, the one or more images extracted in the search step; and a second display step of displaying a predetermined specific page when, among the one or more images displayed as the result of search, a personally photographed image is operated, the personally photographed image being an image associated with a first-type user account and photographed at a facility corresponding to a second-type user account that is different from the first-type user account, the specific page corresponding to the second-type user account.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 2 is a diagram showing an example of user account information which is used in the image search system according to the embodiment of the present disclosure;

FIG. 3 is a diagram showing an example of image information which is used in the image search system according to the embodiment of the present disclosure;

FIG. 4 is a diagram showing an example of business profile information which is used in the image search system according to the embodiment of the present disclosure;

DETAILED DESCRIPTION OF EMBODIMENTS

The following describes an embodiment of the present disclosure with reference to the accompanying drawings for the understanding of the present disclosure. It should be noted that the following embodiment is an example of a specific embodiment of the present disclosure and should not limit the technical scope of the present disclosure.

[Image Search System 1]

Figure 1:
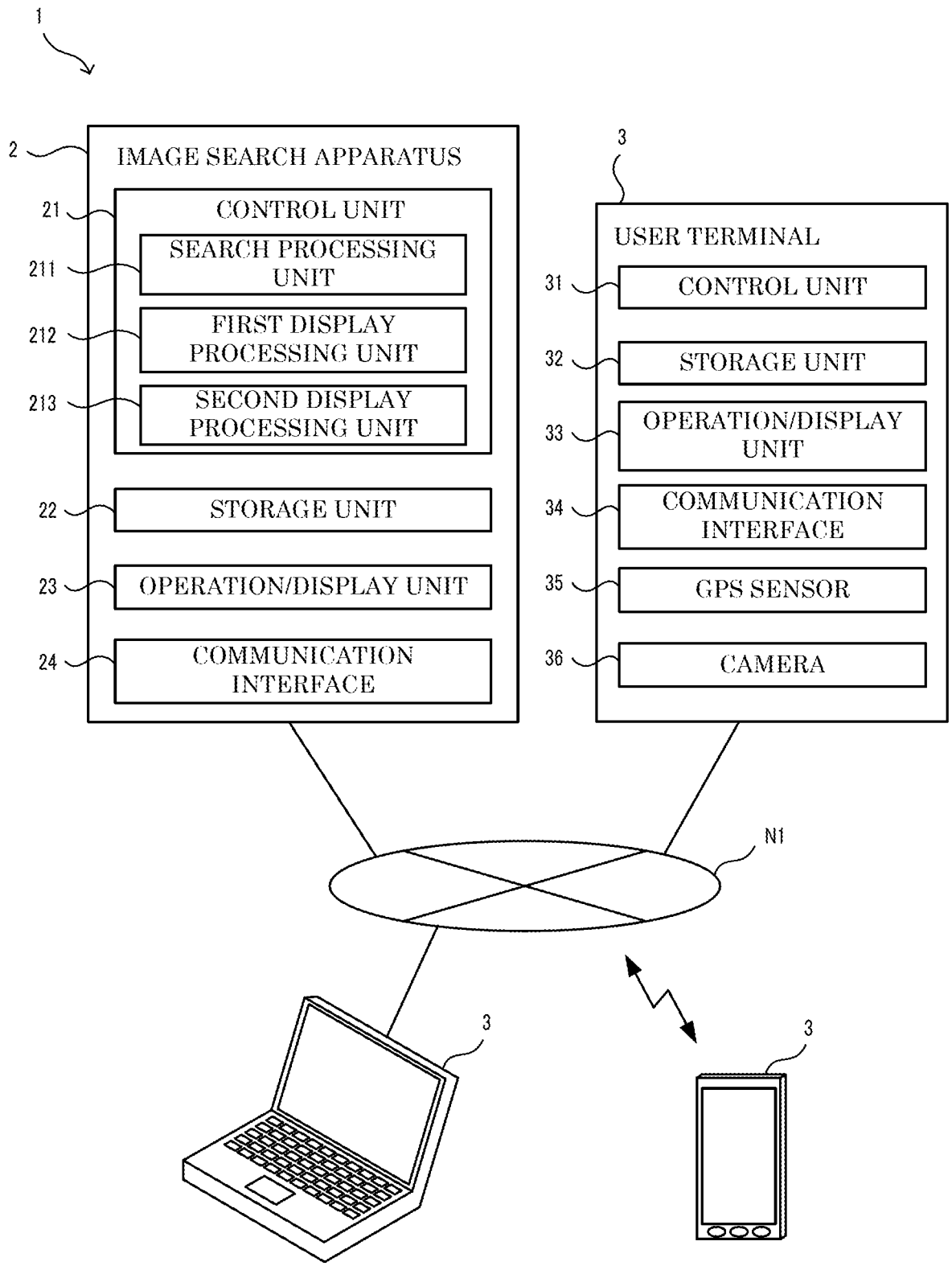
FIG. 1 is a block diagram showing a configuration of an image search system according to an embodiment of the present disclosure.

As shown in FIG. 1, an image search system 1 according to an embodiment of the present disclosure includes an image search apparatus 2 and one or more user terminals 3. The image search apparatus 2 and the user terminals 3 can communicate with each other via a communication network N1 such as the Internet, a LAN, a WAN, or a public telephone line.

The image search apparatus 2 is a server that provides an image sharing service through which users can disclose images that the users themselves photographed to public users. The image search apparatus 2 has an image search function for searching for an image(s) that meets a search condition, from among a plurality of images uploaded (posted) by a plurality of users.

Meanwhile, a user (here, tentatively referred to as a user X) who wants to eat delicious carbonara may use the image search function of the image sharing service to search for a restaurant(s) that appears to provide delicious carbonara. In this case, the user X who has performed a search using "carbonara" as a keyword may browse images of carbonara displayed as the search result, see an image of carbonara that was photographed at a restaurant (here, tentatively referred to as a restaurant X) by another user (here, tentatively referred to as a user Y), and want to visit the restaurant X. However, if the user X operates the image of carbonara, the image sharing service displays only a profile page of the user Y. That is, the image sharing service cannot effectively guide the user X who is interested in the restaurant X, to the profile page of the restaurant X. On the other hand, the image search apparatus 2 of the present embodiment can effectively guide a user who views images displayed as a result of search, to the profile page of the business account such as a restaurant.

[Image Search Apparatus 2]

As shown in FIG. 1, the image search apparatus 2 is a server including a control unit 21, a storage unit 22, an operation/display unit 23, and a communication interface 24. It is noted that the image search apparatus 2 is not limited to a computer, but may be a computer system in which a plurality of computers operate in cooperation with each other. In addition, various processes executed by the image search apparatus 2 may be distributedly executed by one or more processors.

The communication interface 24 connects the image search apparatus 2 to the communication network N1 through a wire or wirelessly, and performs a data communication with external devices such as the user terminals 3 via the communication network N1 in accordance with a predetermined communication protocol.

The operation/display unit 23 is a user interface including a display unit and an operation unit, wherein the display unit is, for example, a liquid crystal display or an organic EL display for displaying various types of information, and the operation unit is, for example, a mouse, a keyboard, or a touch panel for receiving operations.

The storage unit 22 is a nonvolatile storage unit such as a HDD (Hard Disk Drive) or a SSD (Solid State Drive) for storing various types of information. Specifically, the storage unit 22 stores data such as user account information D1, image information D2, and business profile information D3. Here, FIG. 2 is a diagram showing an example of the user account information D1. FIG. 3 is a diagram showing an example of the image information D2. FIG. 4 is a diagram showing an example of the business profile information D3.

As shown in FIG. 2, the user account information D1 is composed of one or more pieces of information which respectively correspond to one or more users registered in the image sharing service and each include information "user ID", "password", and "account type". The "user ID" is identification information for identifying the user. The "password" is authentication information for authenticating the user. The "account type" is an account type of the user (specifically, a personal account or a business account). The personal account is a user account of a general user. The personal account is an example of a "first-type user account" of the present disclosure. The business account is a user account of a business such as a restaurant, an accommodation, or an online shop. The business account is an example of a "second-type user account" of the present disclosure. The user account information D1 is consulted by the control unit 21 as necessary during an upload process (see FIG. 5) or an image search process (see FIG. 6) that are described below.

The image information D2 is composed of one or more pieces of information which respectively correspond to one or more images uploaded (posted) to the image search apparatus 2 and each include information "image ID", "user ID", "tag information", and "position information". The "image ID" is identification information for identifying the image. The "user ID" is identification information for identifying a user who uploaded the image. The "tag information" indicates a hash tag attached to the image. The hash tag is a character string that is attached to the image by the user as necessary when the image is uploaded. A plurality of hash tags may be attached to one image. It is noted that as another embodiment, a hash tag(s) may be automatically attached based on a result of image recognition performed by an AI (artificial intelligence). The "position information" indicates a location where the image was photographed, and is, for example, a geographical name or a facility name. The "position information" is specified or selected by the user when the image is uploaded. It is noted that as another embodiment, the position information may be automatically set based on Exif (Exchangeable image file format) information included in image data of the image. In addition, the position information may be automatically set based on the current position of a user terminal 3 when the image is uploaded from the user terminal 3 to the image search apparatus 2.

The business profile information D3 is composed of one or more pieces of information which respectively correspond to one or more business accounts and include information "user ID", "facility name", "telephone number", "email address", "address", and "reservation web page". The "user ID" is identification information for identifying the business account. The "facility name" is a name of a facility (for example, a restaurant or an accommodation) corresponding to the business account. The "telephone number" is a telephone number of the facility. The "email address" is an email address of the facility. The "address" is the address of the facility. The "reservation web page" is an address (for example, a URL) of a web page that receives online reservation (web reservation) of the facility. It is noted that the web page may be provided by another server (for example, a server of a dish information providing site that provides information about restaurants) that is different from the image search apparatus 2. The information, such as the "facility name", the "telephone number", the "email address", the "address", and the "reservation web page", included in the business profile information D3 is set by the user as necessary when the business account is registered in the image sharing service.

It is noted that as another embodiment, a part or whole of the user account information D1, the image information D2, and the business profile information D3 may be stored in another server to which the image search apparatus 2 is accessible via the communication network N1. In addition, the control unit 21 of the image search apparatus 2 may acquire various types of information from the server, and execute the processes such as the image search process (see FIG. 6) described below.

The storage unit 22 also stores data of a search page (not shown) on which search conditions are input. In addition, the storage unit 22 stores data of a search result page P1 (see FIG. 7, FIG. 9), a display setting page P2 (see FIG. 8), and a profile page P3 (see FIG. 10) that are described below, as well. It is noted that various "pages" displayed on the user terminals 3 in the present embodiment are "web pages" written by a mark-up language such as HTML and displayed via browser software.

Furthermore, the storage unit 22 stores control programs, such as an image search program, that causes the control unit 21 to execute the image search process (see FIG. 6) that is described below. For example, the image search program is recorded on a non-transitory computer-readable recording medium such as a CD or a DVD, read by a reading device (not shown) such as a CD drive or a DVD drive included in the image search apparatus 2, and stored in the storage unit 22.

The control unit 21 includes control equipment such as a CPU, a ROM, and a RAM. The CPU is a processor that executes various calculation processes. The ROM is a nonvolatile storage unit in which control programs, such as a BIOS and an OS, for causing the CPU to execute the various calculation processes are stored in advance. The RAM is a volatile or nonvolatile storage unit for storing various types of information, and is used as a temporary storage memory (working area) for the various types of processes executed by the CPU. The control unit 21 controls the image search apparatus 2 by causing the CPU to execute the various types of control programs that have been stored in the ROM or the storage unit 22 in advance.

Specifically, as shown in FIG. 1, the control unit 21 includes various processing units such as a search processing unit 211, a first display processing unit 212, and a second display processing unit 213. The control unit 21 functions as these processing units when it causes the CPU to execute the various processes in accordance with the image search program. It is noted that a part or whole of the processing units included in the control unit 21 may be formed as an electronic circuit such as an integrated circuit such as ASIC (Application Specific Integrated Circuit). It is noted that the image search program may be a program that causes a plurality of processors to function as the various processing units.

The search processing unit 211 extracts one or more images that meet the search condition(s), from a plurality of images associated with user accounts. For example, the plurality of images are images that were uploaded from the user terminals 3 to the image search apparatus 2 and stored in the storage unit 22. The images uploaded from the user terminals 3 to the image search apparatus 2 are associated with the user accounts as indicated in the image information D2 shown in FIG. 3. For example, the image A shown in FIG. 3 is associated with a user account whose user ID is "user C". In addition, the image C is associated with a user account whose user ID is "user D". For example, the search condition is set in accordance with a user operation input to a user terminal 3. The user of the user terminal 3 can input, as the search condition, a search keyword composed of a character string. The search processing unit 211 is configured to consult the image information D2 to extract one or more images associated with a hash tag that matches the keyword, from the plurality of images stored in the storage unit 22.

Figure 7:
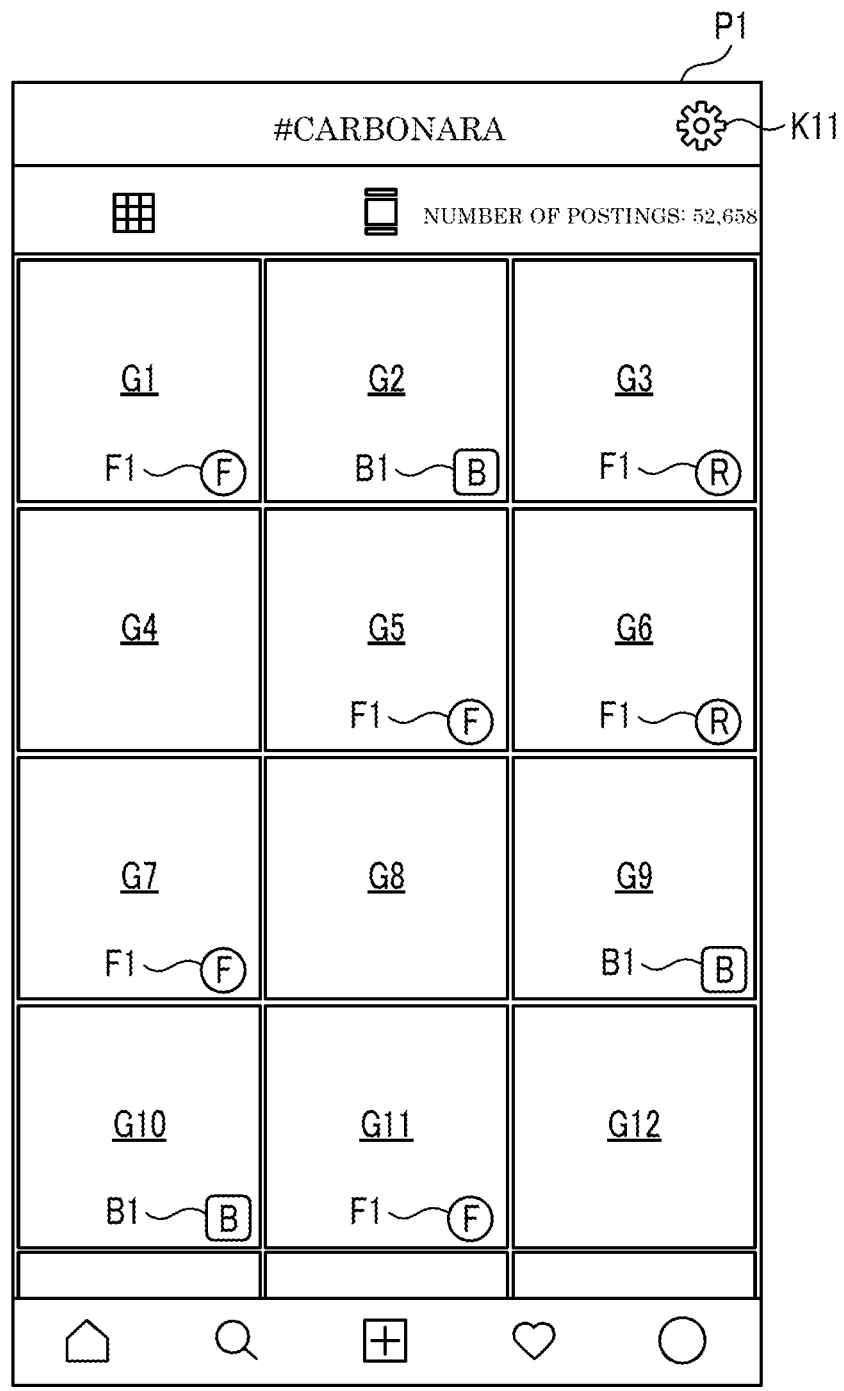
FIG. 7 is a diagram showing an example of a search result page displayed on a user terminal in the image search system according to the embodiment of the present disclosure.

The first display processing unit 212 displays, as a search result, the one or more images extracted by the search processing unit 211. For example, the first display processing unit 212 generates data of the search result page P1 as shown in FIG. 7, and transmits the generated data to the user terminal 3 via the communication interface 24 and the communication network N1. This allows the search result page P1 to be displayed on the storage unit 33 of the user terminal 3. FIG. 7 shows an example of the search result page P1 displayed as a result of a search for which a character string "carbonara" was input as the search condition. In this example, 52,658 images with a hash tag "carbonara" attached thereto were extracted, and the user can freely browse the 52,658 images by performing a scroll operation in the search result page P1.

The images displayed as the search result by the first display processing unit 212 include an image associated with a first-type user account (for example, the personal account) and an image associated with a second-type user account (for example, the business account). In the following description, it is supposed that the first-type user account is the personal account, and the second-type user account is the business account. Images associated with the personal account are uploaded by general users. Images associated with the business account are uploaded by facilities such as restaurants.

As in the search result page P1 shown in FIG. 7, the first display processing unit 212 may overlay a predetermined operation image F1 on, among one or more images displayed as the search result, each image (hereinafter referred to as a "personally photographed image") that is associated with a personal account and was photographed at a facility (for example, a restaurant or an accommodation) corresponding to a business account. In particular, as shown in FIG. 7, the first display processing unit 212 is configured to display a plurality of images concurrently in alignment in the search result page P1 as the search result, and display the operation image F1 overlaid on each personally photographed image among the plurality of images displayed in the search result page P1.

Figure 8:
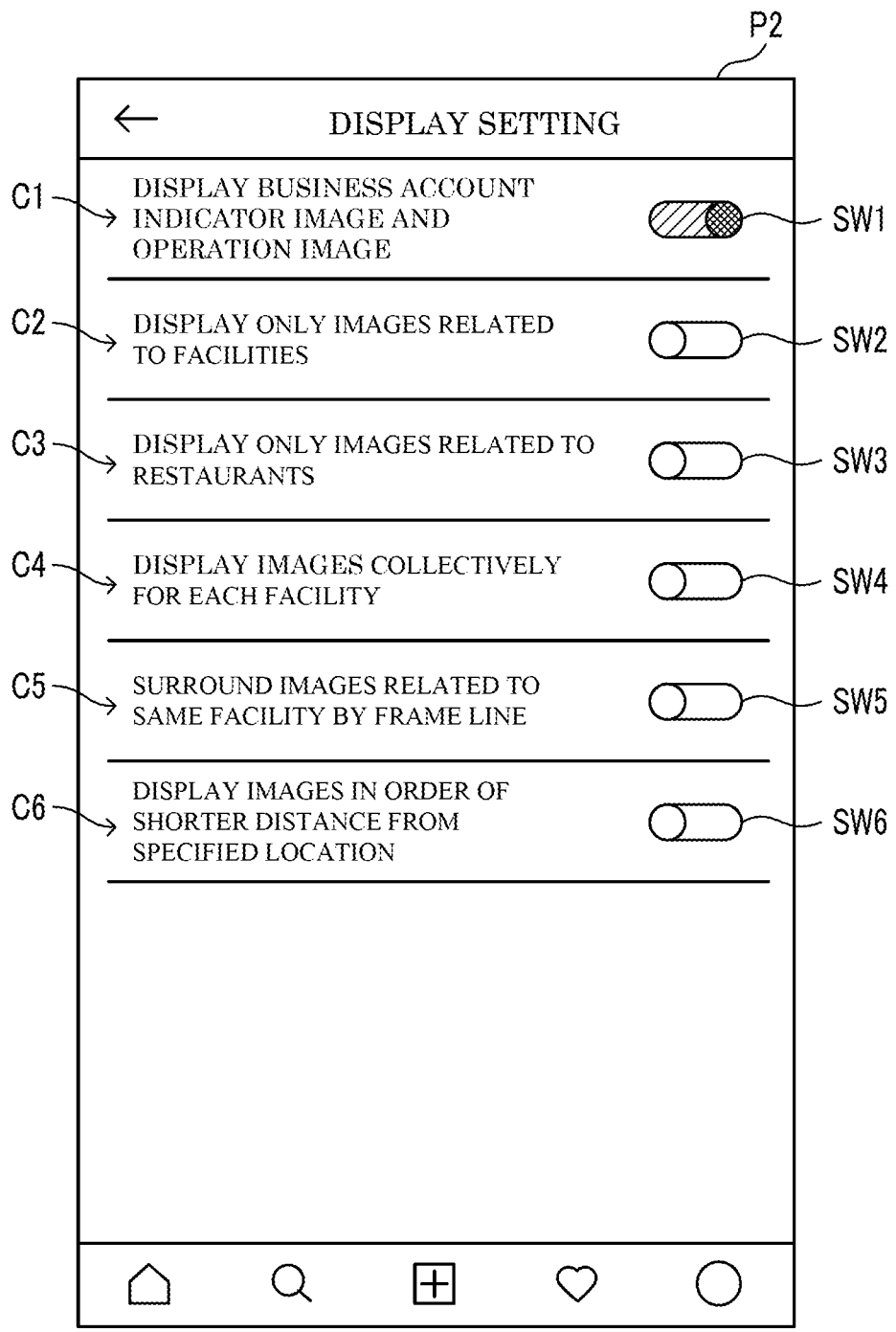
FIG. 8 is a diagram showing an example of a display setting page displayed on the user terminal in the image search system according to the embodiment of the present disclosure.

The first display processing unit 212 may switch a mode of displaying the personally photographed images between a first display mode and a second display mode in accordance with a user input, wherein in the first display mode, the operation image F1 is overlaid, and in the second display mode, the operation image F1 is not overlaid. For example, the first display processing unit 212 may switch the mode of displaying the personally photographed images between the first display mode and the second display mode in accordance with an operation of a switch key SW1 included in a display setting page P2 shown in FIG. 8. It is noted that the display setting page P2 shown in FIG. 8 is displayed when a display setting key K11 included in the search result page P1 is operated. This allows the user to hide the operation image F1 as necessary to improve the visibility of the images in the search result page P1.

As in the search result page P1 shown in FIG. 7, the first display processing unit 212 may overlay a business account indicator image B1 on images G2, G9, and G10 that are associated with the business account. This allows the user to easily distinguish between images G1, G3 to G8, G11, and G12 that are associated with the personal account and the images G2, G9, and G10 associated with the business account, among a plurality of images G1 to G12 displayed in the search result page P1.

The first display processing unit 212 may switch a mode of displaying the images associated with the business account between a first display mode and a second display mode in accordance with a user input, wherein in the first display mode, the business account indicator image B1 is overlaid, and in the second display mode, the business account indicator image B1 is not overlaid. For example, the first display processing unit 212 may switch the mode of displaying the images associated with the business account between the first display mode and the second display mode in accordance with an operation of the switch key SW1 included in a display setting page P2 shown in FIG. 8. This allows the user to hide the business account indicator image B1 as necessary to improve the visibility of the images in the search result page P1.

The first display processing unit 212 may display information (for example, a facility name or an address) concerning a user account (namely, the business account) corresponding to the images on which the business account indicator image B1 is overlaid, in response to a predetermined operation (for example, a tapping, a clicking, or a long-pressing) performed on the business account indicator image B1. For example, when a long-pressing is detected on a business account indicator image B1 overlaid on an image associated with the business account, the first display processing unit 212 may pop-up display the facility name and the address of the facility corresponding to the business account. This allows the user to easily recognize the facility name and the address of the facility corresponding to the business account.

The first display processing unit 212 may display images related to facilities corresponding to the business account (namely, images photographed at the facilities among: images associated with the business account; and images associated with the personal account), in preference to the other images. For example, when a switch key SW2 included in the display setting page P2 shown in FIG. 8 is set to ON, the first display processing unit 212 may display, in the search result page P1, only images related to facilities corresponding to the business account (namely, only images on which the business account indicator image B1 or the operation image F1 is overlaid). Alternatively, the first display processing unit 212 may display, in the search result page P1, images related to facilities corresponding to the business account at a higher position (namely, at a position closer to the top of the page) than the other images (namely, images on which neither the business account indicator image B1 nor the operation image F1 is overlaid). This allows the user to find a desired facility more easily.

The first display processing unit 212 may display images related to facilities corresponding to a business account of a specific genre (for example, the restaurant genre) in preference to the other images. For example, when a switch key SW3 included in the display setting page P2 shown in FIG. 8 is set to ON, the first display processing unit 212 displays, in the search result page P1, only the images related to the facilities corresponding to the business account of the restaurant genre. Alternatively, the first display processing unit 212 may display, in the search result page P1, the images related to the facilities corresponding to the business account of the restaurant genre at a higher position (namely, at a position closer to the top of the page) than the other images. This allows the user to find a desired facility of a desired genre more easily.

The first display processing unit 212 may display the one or more images extracted by the search processing unit 211 collectively for each facility corresponding to the business account. For example, when a switch key SW4 included in the display setting page P2 shown in FIG. 8 is set to ON, the first display processing unit 212 displays, collectively for each facility corresponding to the business account: images associated with the business account; and images that were each photographed at a facility corresponding to the business account and are associated with the personal account. For example, in the search result page P1 shown in FIG. 9, the images Ga1 and Ga2 are images associated with the business account of a restaurant C (for example, image B shown in FIG. 3), and the images Ga3 to Gab are images related to the restaurant C (for example, image D shown in FIG. 3) among the images associated with the personal account. In addition, the image Gb1 is an image associated with the business account of a restaurant F, and the images Gb2 to Gb5 are images associated with the restaurant F among the images associated with the personal account. In addition, the image Gc1 is an image associated with the business account of restaurant H. This allows the user to browse a plurality of images related to a same facility collectively regardless of whether the images are associated with the business account or the personal account. As a result, this allows the user to find a desired facility more easily.

In a case where the number of images related to a same facility exceeds a predetermined upper limit number, the first display processing unit 212 may initially display only the upper limit number of images in the search result page P1 among the images related to the same facility, and display, in the search result page P1, an expansion operation key that is operated to display the remaining images. Subsequently, in response to an operation of the expansion operation key, the first display processing unit 212 may display the remaining images in the search result page P1. In this case, the first display processing unit 212 may initially display images associated with the business account in the search result page P1 among the images related to the facility in preference to the other images.

The first display processing unit 212 may display, among a plurality of images collected for each facility, images associated with the business account in preference to personally photographed images. For example, as in the search result page P1 shown in FIG. 9, the first display processing unit 212 may display, among images Ga1 to Ga6 related to the restaurant C, images Ga1 and Ga2 associated with the business account at a higher position (namely, at a position closer to the top of the search result page P1) than images Ga3 to Ga6 that are personally photographed images. Similarly, the first display processing unit 212 may display, among images Gb1 to Gb5 related to the restaurant F, an image Gb1 associated with the business account at a higher position (namely, at a position closer to the top of the search result page P1) than images Gb2 to Gb5 that are personally photographed images. This allows the user to easily find images associated with the business account from a plurality of images collected for each facility.

The first display processing unit 212 may display the one or more images extracted by the search processing unit 211 collectively for each facility corresponding to the business account in an order according to the distance from a location to the facility, wherein the location is indicated by position information that is input. For example, when a switch key SW6 included in the display setting page P2 shown in FIG. 8 is set to ON, the first display processing unit 212 displays, collectively for each facility corresponding to the business account, the one or more images extracted by the search processing unit 211 in an order of shorter distance from a location specified by the user, to the facility. With this configuration, images are displayed in an order starting with an image of a facility closest to the location indicated by the position information. This allows the user to easily find a desired facility from facilities closer to the location indicated by the position information. It is noted that the position information may indicate the current position of the user terminal 3, or indicate a location specified by the user.

The first display processing unit 212 may display the one or more images extracted by the search processing unit 211 in a display mode where each collection of images related to a same facility can be visually confirmed. For example, when a switch key SW5 included in the display setting page P2 shown in FIG. 8 is set to ON, the first display processing unit 212 surrounds a plurality of images related to a same facility by a frame line so that the collection of the images related to the same facility can be visually confirmed. For example, in the search result page P1 shown in FIG. 9, images Ga1 to Ga6 related to the restaurant C are surrounded by a frame line L1 and images Gb1 to Gb5 related to the restaurant F are surrounded by a frame line L2. This allows the user to easily recognize images related to a same facility. It is noted that as another embodiment, the first display processing unit 212 may assign a different color of contour line of image or a different background color of image to each facility so that each collection of images related to a same facility can be visually confirmed.

The second display processing unit 213 is configured to, when, among one or more images displayed as a result of search, a personally photographed image is operated, display a profile page P3 (see FIG. 10) of a business account corresponding to a facility at which the personally photographed image was photographed. Specifically, when the operation image F1 overlaid on the personally photographed image is operated (for example, tapped, clicked, or long-pressed), the second display processing unit 213 displays the profile page P3 corresponding to the business account. The profile page P3 is provided for each user account. For example, in the profile page P3, a user ID of a corresponding user account and an image(s) associated with the user account (namely, an image uploaded by a user corresponding to the user account) are displayed. The profile page P3 is an example of a "specific page" of the present disclosure.

It is noted that when, among one or more images displayed as a result of search, an image associated with a business account is operated, the second display processing unit 213 may display a profile page P3 corresponding to the business account.

In addition, when a part of a personally photographed image other than the operation image F1 is operated, the second display processing unit 213 may display a profile page P3 of a personal account corresponding to the personally photographed image.

Figure 9:
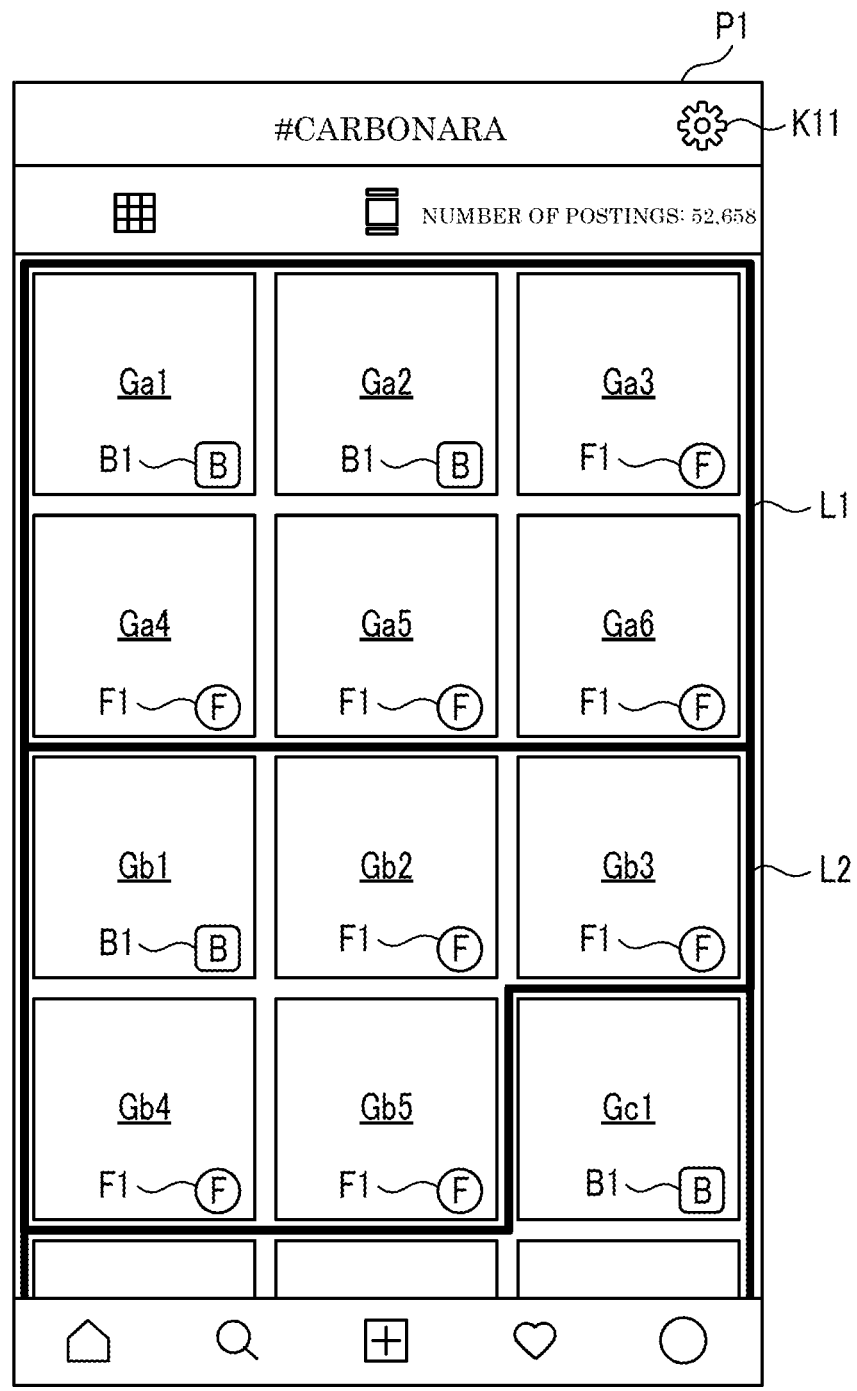
FIG. 9 is a diagram showing an example of the search result page displayed on the user terminal in the image search system according to the embodiment of the present disclosure.

In a case where images associated with a business account (for example, images Ga1 and Ga2 shown in FIG. 9) are included in a collection of images related to a same facility as in the search result page P1 shown in FIG. 9, the second display processing unit 213 may not display the profile page P3 corresponding to the business account even if a personally photographed image (for example, any one of images Ga3 to Ga6 shown in FIG. 9) in the collection of images is operated. In addition, the second display processing unit 213 may display the profile page P3 corresponding to the business account only when an image associated with the business account (for example, any one of images Ga1 and Ga2 shown in FIG. 9) is operated. This allows images associated with the business account (images that generally have higher quality and higher appeal effects than personally photographed images) to be securely viewed by the user. In this case, the second display processing unit 213 may hide the operation image F1.

[User Terminal 3]

As shown in FIG. 3, each of the user terminals 3 includes a control unit 31, a storage unit 32, an operation/display unit 33, a communication interface 34, a GPS (Global Positioning System) sensor 35, and a camera 36. The user terminal 3 is an information processing apparatus such as a mobile phone, a smartphone, a tablet terminal, or a personal computer.

The communication interface 34 connects the user terminal 3 to the communication network N1 through a wire or wirelessly, and performs a data communication with external devices such as the image search apparatus 2 via the communication network N1 in accordance with a predetermined communication protocol.

The operation/display unit 33 is a user interface including a display unit and an operation unit, wherein the display unit is, for example, a liquid crystal display or an organic EL display that displays various types of information such as messages and web pages, and the operation unit is, for example, a mouse, a keyboard, hard keys, or a touch panel that receives operations.

The storage unit 32 is a nonvolatile storage unit, such as a flash memory, for storing various types of information. For example, the storage unit 32 stores control programs such as an image sharing program. The image sharing program is a control program for causing the control unit 31 to execute a process of uploading (posting) an image to the image search apparatus 2, and a process of browsing images that have been uploaded to the image search apparatus 2. It is noted that as another embodiment, a browser program may be used in place of the image sharing program, as the control program for causing the control unit 31 to execute a process of uploading (posting) an image to the image search apparatus 2, and a process of browsing images that have been uploaded to the image search apparatus 2. The browser program is a control program for causing the control unit 31 to execute a process of communicating with an external apparatus such as the image search apparatus 2 in accordance with a communication protocol such as HTTP (Hypertext Transfer Protocol).

The control unit 31 includes control equipment such as a CPU, a ROM, and a RAM. The CPU is a processor that executes various calculation processes. The ROM is a nonvolatile storage unit in which control programs, such as a BIOS and an OS, for causing the CPU to execute the various calculation processes are stored in advance. The RAM is a volatile or nonvolatile storage unit for storing various types of information, and is used as a temporary storage memory (working area) for the various types of processes executed by the CPU. The control unit 31 controls the user terminal 3 by causing the CPU to execute the various types of control programs that have been stored in the ROM or the storage unit 32 in advance.

The GPS sensor 35 acquires GPS information that includes latitude information and longitude information and indicates the current position of the user terminal 3 based on a signal from a GPS satellite.

The camera 36 includes a lens and an imaging element, and outputs image data corresponding to light incident on the imaging element. The image data output from the camera 36 is converted into image data of a JPEG format, and recorded on the storage unit 32. It is noted that GPS information (longitude, latitude, and altitude) that is acquired by the GPS sensor 35 during photographing, may be embedded as metadata in the image data.

[Upload Process]

Figure 5:
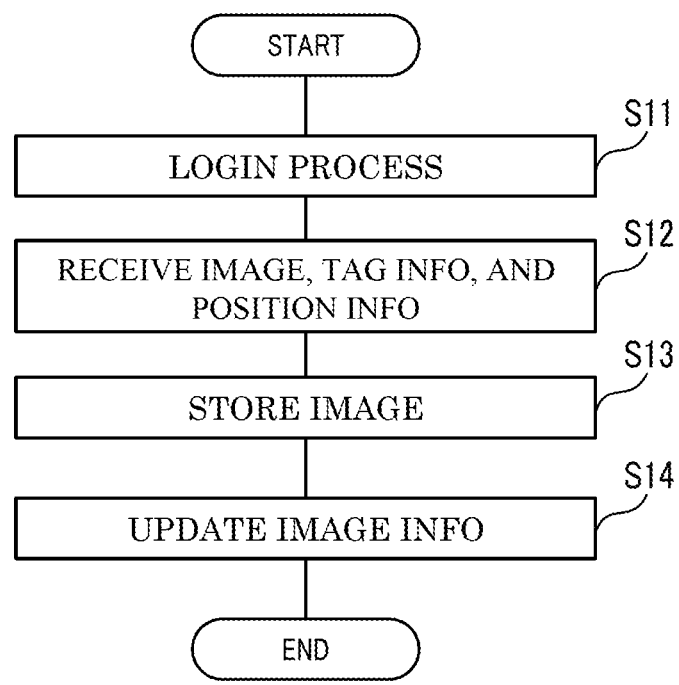
FIG. 5 is a flowchart showing an example of a procedure of an upload process executed in an image search apparatus according to the embodiment of the present disclosure.

The following describes an upload process executed by the control unit 21 of the image search apparatus 2, with reference to FIG. 5. It is noted that the control unit 21 executes the upload process individually for a user terminal 3 when the image search apparatus 2 is accessed from the user terminal 3 (when an upload request is received from the user terminal 3). That is, the control unit 21 may execute a plurality of upload processes respectively for a plurality of user terminals 3 approximately in parallel with each other by time division. In addition, the upload process may be ended halfway when a predetermined operation is performed on the user terminal 3.

<Step S11>

First, in step S11, the control unit 21 executes a login process. Specifically, the control unit 21 receives a user ID and a password from the user terminal 3 via the communication network N1. Subsequently, the control unit 21 determines whether or not the combination of the user ID and the password received from the user terminal 3 is registered in the user account information D1 (see FIG. 2). When it is determined that the combination of the user ID and the password is registered in the user account information D1, the process moves to step S12. On the other hand, when it is determined that the combination of the user ID and the password is not registered in the user account information D1, the upload process ends.

<Step S12>

In step S12, the control unit 21 receives an image, tag information, and position information from the user terminal 3 via the communication network N1. It is noted that the tag information and the position information may be omitted.

<Step S13>

In step S13, the control unit 21 stores the image received in the step S12, into the storage unit 22.

<Step S14>

In step S14, the control unit 21 updates the image information D2 (see FIG. 3) based on the user ID received in the step S11, and the image, the tag information, and the position information received in the step S12. This allows the image stored in the storage unit 22 in the step S13 to be associated with the user ID, the tag information, and the position information. This ends the upload process.

As a result of the upload process, the image uploaded (posted) from the user terminal 3 is stored in the storage unit 22 in a state where the image is associated with either of the two types of user accounts: the personal account; or the business account.

[Image Search Process]

Figure 6:
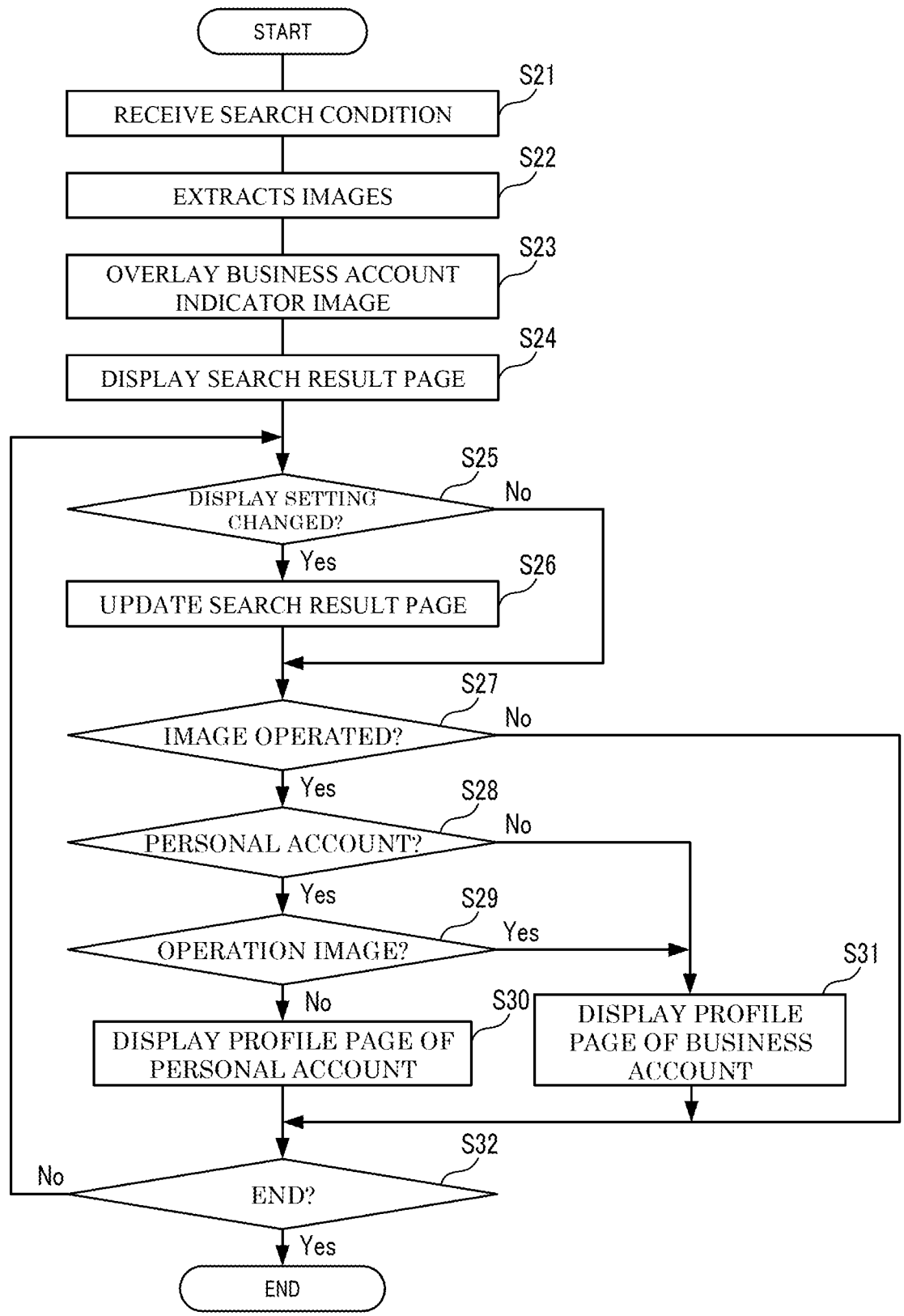
FIG. 6 is a flowchart showing an example of a procedure of an image search process executed in the image search apparatus according to the embodiment of the present disclosure.

The following describes an image search process executed by the control unit 21 of the image search apparatus 2, with reference to FIG. 6. It is noted that the control unit 21 executes the image search process individually for a user terminal 3 when the image search apparatus 2 is accessed from the user terminal 3 (when an image search request is received from the user terminal 3). That is, the control unit 21 may execute a plurality of image search processes respectively for a plurality of user terminals 3 approximately in parallel with each other by time division. In addition, the image search process may be ended halfway when a predetermined operation is performed on the user terminal 3.

It is noted that the present disclosure can be considered as an invention of an image search method that executes one or more steps included in the image search process, wherein one or more steps included in the image search process described here may be omitted appropriately. It is noted that the steps of the image search process may be executed in different orders as far as similar actions and effects are produced. The following describes an example where the control unit 21 executes the steps of the image search process. However, as another embodiment, the steps of the image search process may be distributedly executed by a plurality of processors.

<Step S21>

First, in step S21, the control unit 21 receives a search condition for searching for an image(s) from a user terminal 3 via the communication network N1. For example, the control unit 21 displays a search condition input page (not shown) for inputting the search condition on the operation/display unit 33 of the user terminal 3. Subsequently, the control unit 21 receives a search condition that is input on the search condition input page by the user of the user terminal 3, from the user terminal 3 via the communication network N1. The search condition includes a search keyword that is composed of a character string input by the user.

<Step S22>

In step S22, the control unit 21 extracts one or more images that meet the search condition received in the step S21, from a plurality of images stored in the storage unit 22 (namely, a plurality of images uploaded from the plurality of user terminals 3). Specifically, the control unit 21 compares the search keyword acquired in the step S21 with the tag information included in the image information D2 (see FIG. 3), and extracts one or more images attached with a hash tag that matches the search keyword. The process of the step S22 is executed by the search processing unit 211 of the control unit 21. The step S22 is an example of a search step of the present disclosure.

It is noted that as another embodiment, the control unit 21 may extract one or more images associated with position information that includes a character string indicated by the search keyword, from the plurality of images stored in the storage unit 22. In addition, the control unit 21 may extract one or more images associated with a user ID that includes a character string indicated by the search keyword, from the plurality of images stored in the storage unit 22.

<Step S23>

In step S23, the control unit 21 overlays the business account indicator image B1 on an image(s) associated with the business account, among the one or more images extracted in the step S22. In addition, the control unit 21 overlays the operation image F1 on a personally photographed image(s) (namely, an image photographed by a general user at a facility corresponding to the business account), among the one or more images extracted in the step S22. It is noted that specifically, the personally photographed image is an image associated with a personal account, and position information included in a piece of image information D2 corresponding to the image indicates a facility corresponding to a business account. For example, when position information included in a piece of image information D2 corresponding to an image matches an address included in a piece of business profile information D3 corresponding to a business account, the image is determined to be a personally photographed image, and the operation image F1 is overlaid on the image. In this way, the control unit 21 is configured to determine whether or not an image is a personally photographed image based on the image information D2 and the business profile information D3, and determine whether or not to overlay the operation image F1 on the image.

<Step S24>

In step S24, the control unit 21 displays the search result page P1 that includes the one or more images extracted in the step S22, on the operation/display unit 33 of the user terminal 3. Specifically, the control unit 21 transmits data of the search result page P1 shown in FIG. 7 to the user terminal 3 via the communication network N1. This allows the search result page P1 to be displayed on the operation/display unit 33 of the user terminal 3. The one or more images extracted in the step S22 are displayed in the search result page P1. In addition, among the one or more images displayed in the search result page P1, images associated with the business account are displayed with the business account indicator image B1 overlaid thereon. In addition, the personally photographed images are displayed with the operation image F1 overlaid thereon. The process of the step S24 is executed by the first display processing unit 212 of the control unit 21. The step S24 is an example of a "first display step" of the present disclosure.

<Step S25>

In step S25, the control unit 21 determines whether or not the display setting has been changed. Specifically, when the display setting key K11 included in the search result page P1 is operated, the control unit 21 displays the display setting page P2 shown in FIG. 8, on the operation/display unit 33 of the user terminal 3. Subsequently, when any one of the switch keys SW1 to SW6 included in the display setting page P2 is operated, the control unit 21 determines that the display setting has been changed. When it is determined that the display setting has been changed (S25: Yes), the process moves to step S26. On the other hand, when it is determined that the display setting has not been changed (S25: No), the process moves to step S27.

<Step S26>

In step S26, the control unit 21 updates the search result page P1. Specifically, the control unit 21 updates the search result page P1 in accordance with a user operation performed on the display setting page P2, and displays the updated search result page P1 on the operation/display unit 33 of the user terminal 3. The process of the step S26 is executed by the first display processing unit 212 of the control unit 21.

For example, when the switch key SW1 included in the display setting page P2 is changed from ON to OFF, the control unit 21 hides the business account indicator image B1 and the operation image F1 in the search result page P1. On the other hand, when the switch key SW1 included in the display setting page P2 is changed from OFF to ON, the control unit 21 displays the business account indicator image B1 and the operation image F1 in the search result page P1. As a result, the business account indicator image B1 is overlaid on the images associated with the business account, and the operation image F1 is overlaid on the personally photographed images.

In addition, when the switch key SW2 included in the display setting page P2 is changed from OFF to ON, in the search result page P1, the control unit 21 displays only images related to facilities corresponding to the business account (namely, images associated with the business account, and images photographed at the facilities among images associated with the personal account). As a result, in the search result page P1, only images on which the business account indicator image B1 or the operation image F1 is overlaid are displayed. On the other hand, when the switch key SW2 included in the display setting page P2 is changed from ON to OFF, in the search result page P1, the control unit 21 displays all the images extracted in the step S22.

In addition, when the switch key SW3 included in the display setting page P2 is changed from OFF to ON, the control unit 21 displays only images related to facilities corresponding to the business account of the restaurant genre. As a result, in the search result page P1, among the images on which the business account indicator image B1 or the operation image F1 is overlaid, only images related to restaurants are displayed. On the other hand, when the switch key SW3 included in the display setting page P2 is changed from ON to OFF, in the search result page P1, the control unit 21 displays all the images extracted in the step S22.

In addition, when the switch key SW4 included in the display setting page P2 is changed from OFF to ON, the control unit 21 rearranges the images to be displayed in the search result page P1 such that the images are displayed collectively in the search result page P1 for each facility corresponding to the business account. As a result, in the search result page P1, the images are displayed collectively for each facility corresponding to the business account. On the other hand, when the switch key SW4 included in the display setting page P2 is changed from ON to OFF, the control unit 21 rearranges the images to be displayed in the search result page P1 in a predetermined order (for example, in an order of later dates/times of uploading). As a result, in the search result page P1, the images are displayed in a state of being arranged in the predetermined order.

In addition, when the switch key SW5 included in the display setting page P2 is changed from OFF to ON, the control unit 21, in the search result page P1, surrounds images related to a same facility by a frame line (e.g., the frame line L1 and the frame line L2 shown in FIG. 9). On the other hand, when the switch key SW5 included in the display setting page P2 is changed from ON to OFF, the control unit 21 hides the frame line.

In addition, when the switch key SW6 included in the display setting page P2 is changed from OFF to ON, the control unit 21, for example, displays a location setting page (not shown) on the operation/display unit 33 of the user terminal 3, and urges the user to specify a location. On the location setting page, the user can specify the current position of the user terminal 3 or another location. In a case where the user specifies the current position of the user terminal 3 on the location setting page, the control unit 21 receives the GPS information detected by the GPS sensor 35 of the user terminal 3, from the user terminal 3 via the communication network N1. After a location is specified by the user on the location setting page, the control unit 21 rearranges the images to be displayed in the search result page P1 in an order of shorter distance from the location to a facility associated with any one of the images, and displays the rearranged images in the search result page P1. It is noted that the distance from the location to a facility associated with any one of the images is, for example, calculated based on the address included in the business profile information D3. On the other hand, when the switch key SW6 included in the display setting page P2 is changed from ON to OFF, the control unit 21 rearranges the images to be displayed in the search result page P1 in a predetermined order (for example, in an order of later dates/times of uploading), and displays the rearranged images in the search result page P1. As a result, the images rearranged in the predetermined order are displayed in the search result page P1.

<Step S27>

In step S27, the control unit 21 determines whether or not an image included in the search result page P1 has been operated. For example, when an image included in the search result page P1 has been tapped, the control unit 21 determines that an image included in the search result page P1 has been operated. When it is determined that an image included in the search result page P1 has been operated (S27: Yes), the process moves to step S28. On the other hand, when it is determined that any of the images included in the search result page P1 has not been operated (S27: No), the process moves to step S32.

It is noted that as another embodiment, when an image included in the search result page P1 is operated (for example, tapped), the control unit 21 may enlarge the operated image. In addition, when the enlarged image is further operated (for example, further tapped), the process may move to step S28. It is noted that in a case where the enlarged image is a personally photographed image, the operation image F1 may or may not be overlaid on the enlarged image. In addition, the operation image F1 may not be overlaid on the image (personally photographed image) before the enlargement, and the operation image F1 may be overlaid only on the enlarged image (personally photographed image). In addition, in a case where the enlarged image is an image associated with the business account, the business account indicator image B1 may or may not be overlaid on the enlarged image. In addition, the business account indicator image B1 may not be overlaid on the image (image associated with the business account) before the enlargement, and the business account indicator image B1 may be overlaid only on the enlarged image (image associated with the business account).

<Step S28>

In step S28, the control unit 21 determines whether or not the operated image is an image associated with the personal account. Specifically, the control unit 21 consults the user account information D1 and the image information D2 to determine whether or not the operated image is an image associated with the personal account. When it is determined that the operated image is an image associated with the personal account (S28: Yes), the process moves to step S29. On the other hand, when it is determined that the operated image is not an image associated with the personal account (S28: No), the process moves to step S31.

<Step S29>

In step S29, the control unit 21 determines whether or not a position at which the image was operated (for example, tapped) is within a range of the operation image F1. When it is determined that the position at which the image was operated is within a range of the operation image F1 (S29: Yes), the process moves to step S31. On the other hand, when it is determined that the position at which the image was operated is not within the range of the operation image F1 (S29: No), the process moves to step S30.

<Step S30>

In step S30, the control unit 21 displays, on the operation/display unit 33 of the user terminal 3, the profile page P3 of a personal account corresponding to the operated image (namely, a user account of a user who uploaded the image). Specifically, the control unit 21 transmits the data of the profile page P3 corresponding to the personal account, to the user terminal 3 via the communication network N1. As a result, the profile page P3 corresponding to the personal account is displayed on the operation/display unit 33 of the user terminal 3. In the profile page P3, the user ID of the personal account, an image associated with the personal account and the like are displayed. Subsequently, the process moves to step S32. The process of the step S30 is executed by the second display processing unit 213 of the control unit 21.

<Step S31>

In step S31, the control unit 21 displays, on the operation/display unit 33 of the user terminal 3, a profile page P3 of a business account corresponding to the operated image. For example, in a case where the image is an image associated with a business account (namely, in a case where it is determined as "No" in the step S28), the control unit 21 transmits data of the profile page P3 corresponding to the business account, to the user terminal 3 via the communication network N1. As a result, the profile page P3 corresponding to the business account is displayed on the operation/display unit 33 of the user terminal 3. On the other hand, in a case where the image is a personally photographed image (namely, in a case where it is determined as "Yes" in the step S29), the control unit 21 displays, on the operation/display unit 33 of the user terminal 3, a profile page P3 of a business account corresponding to a facility at which the personally photographed image was photographed. Specifically, based on the position information included in the image information D2, the control unit 21 identifies the facility at which the personally photographed image was photographed. Subsequently, based on the business profile information D3, the control unit 21 identifies the business account corresponding to the facility, and transmits the data of the profile page P3 corresponding to the identified business account, to the user terminal 3 via the communication network N1. As a result, the profile page P3 corresponding to the business account is displayed on the operation/display unit 33 of the user terminal 3. The process of the step S31 is executed by the second display processing unit 213 of the control unit 21. The step S31 is an example of "second display step" of the present disclosure.

Figure 10:
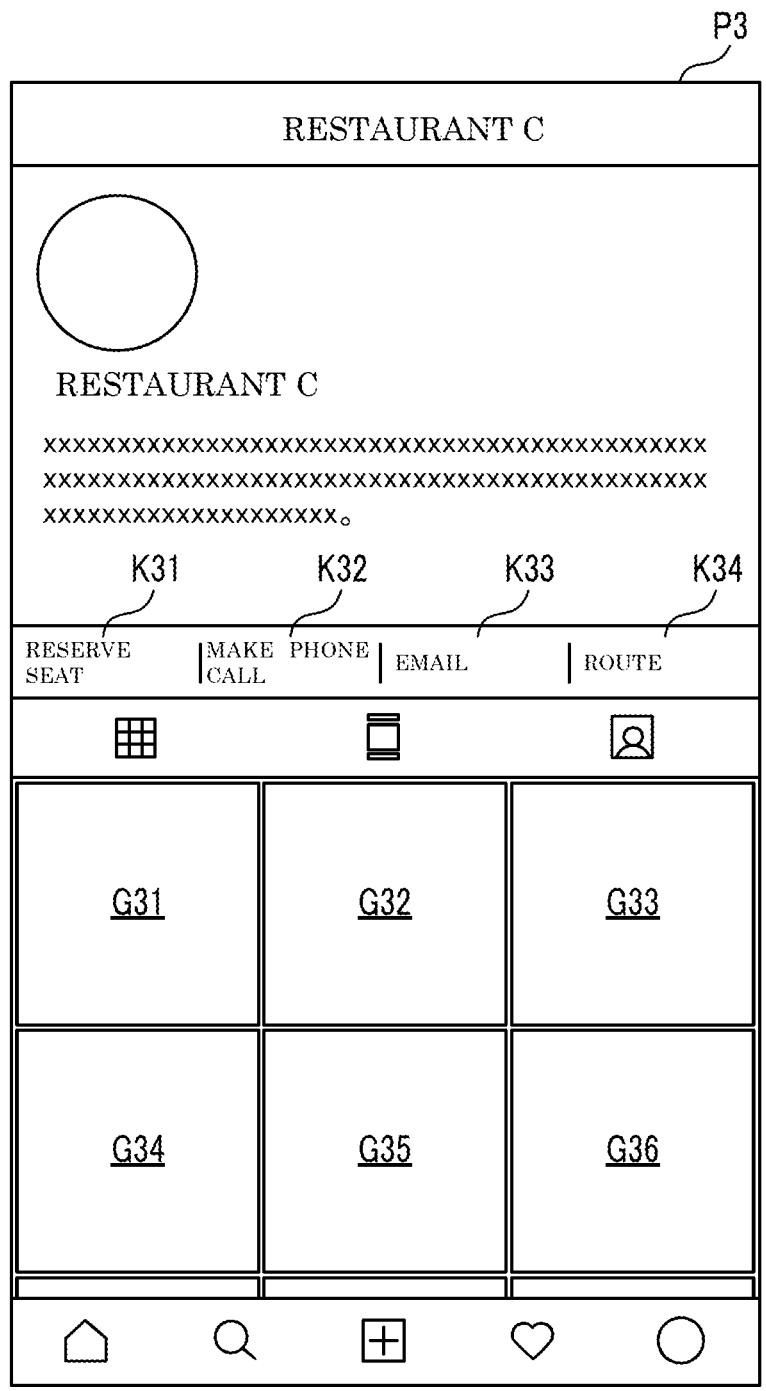
FIG. 10 is a diagram showing an example of a profile page displayed on the user terminal in the image search system according to the embodiment of the present disclosure.

FIG. 10 shows a profile page P3 that corresponds to a business account of restaurant C. As shown in FIG. 10, a profile page P3 corresponding to the business account may include at least one of a reservation key K31, a telephone key K32, an email key K33, and a route key K34.

The reservation key K31 is an operation key for reserving a facility corresponding to the business account. When the reservation key K31 is operated, the control unit 21 transmits information of a reservation web page included in the business profile information D3, to the user terminal 3. The control unit 31 of the user terminal 3 displays a reservation web page on the operation/display unit 33 based on the information of the reservation web page so that the user can make a reservation for the facility on the reservation web page.

The telephone key K32 is an operation key for making a phone call to a facility corresponding to the business account. When the telephone key K32 is operated, the control unit 21 transmits information of a telephone number included in the business profile information D3 to the user terminal 3. The control unit 31 of the user terminal 3 makes a phone call to the facility based on the information of the telephone number.

The email key K33 is an operation key for sending an email to a facility corresponding to the business account. When the email key K33 is operated, the control unit 21 transmits information of an email address included in the business profile information D3 to the user terminal 3. The control unit 31 of the user terminal 3 displays an email creation screen on the operation/display unit 33 based on the information of the email address so that on the email creation screen, the user can create an email addressed to the facility.

The route key K34 is an operation key for showing a route to a facility corresponding to the business account. When the route key K34 is operated, the control unit 21 transmits information of an address included in the business profile information D3 to the user terminal 3. The control unit 31 of the user terminal 3 displays a map on the operation/display unit 33 based on the information of the address, wherein the map shows a route from the current position of the user terminal 3 to the address of the facility.

<Step S32>

In step S32, the control unit 21 determines whether or not to end the image search process. For example, when a predetermined end operation is performed, the control unit 21 may determine to end the image search process. Alternatively, when any one of the reservation key K31, the telephone key K32, the email key K33, and the route key K34 included in the profile page P3 is operated, the control unit 21 may determine to end the image search process. When the control unit 21 determines to end the image search process (S32: Yes), the image search process is ended. On the other hand, when the control unit 21 determines not to end the image search process (S32: No), the process returns to the step S25.

As described above, according to the image search apparatus 2 of the present embodiment, among images meeting a search condition, personally photographed images that were photographed by general users at facilities corresponding to the business account, are displayed with the operation image F1 overlaid thereon. In addition, when the operation image F1 overlaid on a personally photographed image is operated, the profile page P3 of the business account corresponding to the facility at which the personally photographed image was photographed, is displayed. As a result, when a user is interested in a facility corresponding to a business account by viewing a personally photographed image that was photographed by a general user at the facility, the user can easily view the profile page P3 of the business account corresponding to the facility by operating the operation image F1 overlaid on the personally photographed image. As a result, the image search apparatus 2 of the present embodiment can effectively guide a user who views images displayed as a result of search, to the profile page P3 of the business account such as a restaurant.

In addition, the image search apparatus 2 of the present embodiment can display images that meet a search condition, collectively for each facility related to the images. As a result, according to the image search apparatus 2 of the present embodiment, the user can recognize a plurality of images related to a same facility collectively regardless of whether the images are associated with the business account or the personal account. This allows the user to find a desired facility more easily.

In addition, the present embodiment describes an example where, as shown in at least FIG. 7, the operation image F1 is a character "F" surrounded by a circle representing "facility". However, as another embodiment, the operation image F1 may be one or more characters. Similarly, as shown in at least FIG. 7, the business account indicator image B1 is a character "B" surrounded by a square representing "business". However, as another embodiment, the business account indicator image B1 may be one or more characters. In addition, the operation image F1 or the business account indicator image B1 may be a mark or the like that does not include a character.

In the present embodiment, an example of the specific page of the present disclosure is the profile page P3 of the business account. However, the specific page may be a reservation information page in which information regarding reservation of a facilty corresponding to the business account is displayed. Specifically, the reservation information page may be the reservation web page in which a reservation of the facility can be received. For example, in the reservation information page displayed on the user terminal 3, the control unit 21 can search for or display the date or date/time for which a reservation can be made, and can receive, from the user terminal 3, a request to make a reservation for a displayed date or date/time. In addition, the reservation information page may be a web page of a site stored in an external server managed by a business that corresponds to the business account. It is noted that various types of information such as the menu, location, and budget may be displayed in the reservation information page, as information related to the reservation of the facility. By displaying the reservation information page as the specific page in this way, it is possible to urge the user to make a reservation for a facility corresponding to the personally photographed image.

Furthermore, when a facility corresponding to the personally photographed image can be reserved from the reservation web page, the control unit 21 may display the reservation information page as the specific page, and when a facility corresponding to the personally photographed image cannot be reserved from the reservation web page, the control unit 21 may display another web page such as the profile page P3, as the specific page. For example, in the business profile information D3, the reservation web page information may be registered only with regard to facilities that can be reserved online, and the reservation web page information may not be registered with regard to facilities that cannot be reserved online. In this case, if the reservation web page information is included in the business profile information D3 of the business account of a facility corresponding to the personally photographed image, the control unit 21 determines that the facility can be reserved on line. It is noted that the business profile information D3 may include information that shows whether or not the online reservation is available. In this way, the control unit 21 may determine, based on the business profile information D3, whether or not a facility corresponding to the personally photographed image can be reserved from the reservation web page, and may, in accordance with the determination result, change the content of the web page that is displayed as the specific page. This makes it possible to urge the user to reserve the facility when the facility can be reserved from the reservation web page.

Furthermore, as shown in FIG. 7, when a facility corresponding to the personally photographed image can be reserved from the reservation web page, the control unit 21 may overlay, as the operation image F1, a first operation image such as a character "R" surrounded by a circle representing "reservation", to indicate that the web reservation of the facility is available, and when a facility corresponding to the personally photographed image cannot be reserved from the reservation web page, the control unit 21 may overlay, as the operation image F1, a second operation image such as a character "F" surrounded by a circle representing "facility". That is, the control unit 21 may switch between different operation images F1 depending on whether a facility corresponding to the personally photographed image can be reserved from the reservation web page so that the operation image F1 indicates whether a facility corresponding to the personally photographed image can be reserved online. This allows the user to easily recognize, by seeing the operation image F1, whether or not a facility can be reserved.

It is noted that when a facility can be reserved from the reservation web page, both the first operation image and the second operation image may be displayed as different operation images F1, and in response to an operation of one of the operation images F1, the reservation web page or the profile page P3 may be displayed. Furthermore, in a case where the image search apparatus 2 has a function to manage vacant seats in each facility, the control unit 21 may overlay an image indicating that the reservation is available, on only personally photographed images that correspond to facilities that can be reserved for the current date/time, or on only images that correspond to facilities that can be reserved for a specified date/time.

Meanwhile, as another embodiment, when, in step S22, the control unit 21 extracts one or more images that meet the search condition received in the step S21 from the plurality of images stored in the storage unit 22, the control unit 21 may extract only images that correspond to facilities that can be reserved online. It is noted that when the control unit 21 extracts one or more images in step S22, the control unit 21 may switch, in accordance with a user operation, whether or not to extract only images that correspond to facilities that can be reserved online. Furthermore, in a case where the image search apparatus 2 has a function to manage vacant seats in each facility, the control unit 21 may extract only images that correspond to facilities that can be reserved for the current date/rime, or only images that correspond to facilities that can be reserved for a specified date/time.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

What is claimed is:

1. An image search apparatus comprising:
one or more processors configured to execute:
a search processing module to extract a plurality of extracted images that meet a search condition of a search, from a plurality of images associated with user accounts;
a first display processing module to display, as search results, the plurality of extracted images; and
a second display processing module to display a predetermined specific page when, among the plurality of extracted images displayed as the search results, a personally photographed image is operated, the personally photographed image being an image associated with a first-type user account and photographed at a facility corresponding to a second-type user account that is different from the first-type user account, the specific page corresponding to the second-type user account, wherein
the first display processing module is configured to display the personally photographed image with a predetermined operation image overlaid thereon,
the second display processing module is configured to:
display the specific page corresponding to the second-type user account when the operation image overlaid on the personally photographed image is operated; and
display a predetermined specific page corresponding to the first-type user account corresponding to the personally photographed image when a part of the personally photographed image other than the operation image is operated, and
the operation image overlaid on the personally photographed image by the first display processing module indicates whether or not a facility corresponding to the personally photographed image can be reserved online.

2. The image search apparatus according to claim 1, wherein
the first display processing module is configured to:
display, in alignment, two or more of the plurality of the extracted images as the search results; and
overlay the operation image on the personally photographed image among the plurality of extracted images.

3. The image search apparatus according to claim 1, wherein
the first display processing module is configured to determine whether or not each of the plurality of extracted images is a personally photographed image based on position information and one or more addresses corresponding to the second-type user account, the position information indicating one or more positions at which the plurality of extracted images were photographed.

4. The image search apparatus according to claim 1, wherein
the first display processing module is configured to switch a mode of displaying the personally photographed image between a first display mode and a second display mode in accordance with a user input, and
in the first display mode, the operation image is overlaid on the personally photographed image, and in the second display mode, the operation image is not overlaid on the personally photographed image.

5. The image search apparatus according to claim 1, wherein
the search processing module is configured to extract only images that meet the search condition and correspond to facilities that can be reserved online, as the plurality of extracted images.

6. The image search apparatus according to claim 5, wherein
the specific page is a reservation page for making a reservation for the facility.

7. The image search apparatus according to claim 1, wherein
the first-type user account is a personal account, and the second-type user account is a business account.

8. The image search apparatus according to claim 1, wherein the first display processing module is further configured to display the plurality of extracted images collectively for each facility corresponding to the second-type user account.

9. The image search apparatus according to claim 8, wherein
the first display processing module is configured to display collectively:
images associated with the second-type user account; and
personally photographed images that were each photographed at a facility corresponding to the second-type user account.

10. The image search apparatus according to claim 8, wherein
the first display processing module is configured to display, among a plurality of images collected for each facility, an image associated with the second-type user account in preference to the personally photographed image.

11. The image search apparatus according to claim 8, wherein
the first display processing module is configured to display the plurality of extracted images collectively for each facility corresponding to the second-type user account in an order according to a distance from a location to a facility, the location being indicated by position information that is input.

12. The image search apparatus according to claim 8, wherein
the first display processing module is configured to display the plurality of extracted images collectively for each facility in a display mode where each collection of images related to a same facility are visually distinguished.

13. The image search apparatus according to claim 8, wherein
in a case where an image associated with the second-type user account is included in a collection of images related to a same facility, the second display processing module does not display the specific page corresponding to the second-type user account when the personally photographed image in the collection of images is operated.

14. The image search apparatus according to claim 1, wherein
the second display processing module is configured to display the specific page corresponding to the second-type user account when an image associated with the second-type user account among the plurality of extracted images displayed as the search results, is operated.

15. The image search apparatus according to claim 1, wherein
the specific page corresponding to the second-type user account includes at least one of:
an operation key for making a phone call to a facility corresponding to the second-type user account;
an operation key for sending an email to the facility;
an operation key for showing a route to the facility; and
an operation key for reserving the facility.

16. A non-transitory computer-readable recording medium in which is recorded an image search program that causes one or more processors to execute:
a search step of extracting a plurality of extracted images that meet a search condition, from a plurality of images associated with user accounts;
a first display step of displaying, as search results, the plurality of extracted images; and
a second display step of displaying a predetermined specific page when, among the plurality of extracted images displayed as the search results, a personally photographed image is operated, the personally photographed image being an image associated with a first-type user account and photographed at a facility corresponding to a second-type user account that is different from the first-type user account, the specific page corresponding to the second-type user account, wherein
the first display step further includes displaying the personally photographed image with a predetermined operation image overlaid thereon,
the second display step further includes:
displaying the specific page corresponding to the second-type user account when the operation image overlaid on the personally photographed image is operated; and
displaying a predetermined specific page corresponding to the first-type user account corresponding to the personally photographed image when a part of the personally photographed image other than the operation image is operated, and
the operation image overlaid on the personally photographed image indicates whether or not a facility corresponding to the personally photographed image can be reserved online.

17. An image search method that causes one or more processors to execute:
a search step of extracting a plurality of extracted images that meet a search condition, from a plurality of images associated with user accounts;
a first display step of displaying, as search results, the plurality of extracted images; and
a second display step of displaying a predetermined specific page when, among the plurality of extracted images displayed as the search results, a personally photographed image is operated, the personally photographed image being an image associated with a first-type user account and photographed at a facility corresponding to a second-type user account that is different from the first-type user account, the specific page corresponding to the second-type user account, wherein
the first display step further includes displaying the personally photographed image with a predetermined operation image overlaid thereon,
the second display step further includes:
displaying the specific page corresponding to the second-type user account when the operation image overlaid on the personally photographed image is operated; and
displaying a predetermined specific page corresponding to the first-type user account corresponding to the personally photographed image when a part of the personally photographed image other than the operation image is operated, and
the operation image overlaid on the personally photographed image indicates whether or not a facility corresponding to the personally photographed image can be reserved online.

* * * * *